United States Patent
Heemstra et al.

(10) Patent No.: US 6,563,645 B2
(45) Date of Patent: May 13, 2003

(54) METHOD OF PRODUCING A SEGMENTED LENS AND A SCREEN FOR A COLOR DISPLAY DEVICE

(75) Inventors: Tewe Hiepke Heemstra, Eindhoven (NL); Tiemen Poorter, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 170 days.

(21) Appl. No.: 09/888,462

(22) Filed: Jun. 25, 2001

(65) Prior Publication Data

US 2001/0055489 A1 Dec. 27, 2001

(30) Foreign Application Priority Data

Jun. 26, 2000 (EP) ............................................ 00202209

(51) Int. Cl.[7] ............................................... B29D 11/00
(52) U.S. Cl. ...................................... 359/618; 264/1.27
(58) Field of Search ................................. 359/618, 457, 359/741, 742; 354/1; 313/461, 463, 466; 396/546, 547; 356/400; 250/492.22; 430/22, 23, 24; 264/1.27, 219

(56) References Cited

U.S. PATENT DOCUMENTS

| 4,866,466 A | | 9/1989 | van der Waal | 396/547 |
| 5,770,120 A | * | 6/1998 | Kamihara et al. | 264/1.27 |
| 6,020,681 A | * | 2/2000 | Wang et al. | 313/461 |
| 6,490,093 B2 | * | 12/2002 | Guest | 359/619 |

FOREIGN PATENT DOCUMENTS

EP 0737996 A1 10/1996 ............ H01J/9/227

* cited by examiner

*Primary Examiner*—Georgia Epps
*Assistant Examiner*—Omar Hindi

(57) ABSTRACT

In the manufacturing process of color display tubes with a dotted screen pattern, to form the screen (11), a segmented lens (3) is used for exposing the display window (4) in order to apply a structure of a black matrix layer and a layer with electroluminescent material to it. Principally, a segmented lens (3) gives rise to a phenomenon that is called facet marking; this is a result of the fact that the images of consecutive facets (12) of the lens on the screen (11) are disjunct or partly overlap, giving dark lines (42) or bright lines (44). In present day color display tubes—especially for use as computer monitors—it is getting more and more important to reduce facet marking as far as possible. It is proposed to manufacture the segmented lens (3) according to a new process in which the mold (30) for the manufacture of said segmented lens is significantly changed. In the new process, the poles (31) for the mold (30) are stacked by placing them with cylindrical projections (36) into apertures (38) of the carrier plate (37). This prevents leaning poles (31), which result in errors in the inclination of the facets (12). This method of manufacturing the mold (30) makes it possible to decrease the facet size and significantly improve the facet marking in color display tubes.

11 Claims, 4 Drawing Sheets

METHOD OF PRODUCING A SEGMENTED LENS AND A SCREEN FOR A COLOR DISPLAY DEVICE

FIELD OF THE INVENTION

The invention relates to a method of producing a segmented lens which is used in the manufacturing process of colour display tubes.

The invention also relates to the segmented lens itself and to the mould which is used for producing the segmented lens.

Further, the invention relates to a method of producing a screen, having a dotted pattern of apertures in a black matrix and electroluminescent material in said apertures, on a display window of a colour display tube, which method comprises, exposing a photosensitive material on the display window to light which has been emitted by a point source and has passed through the segmented lens and a mask, the segmented lens comprising facets having a diagonal, with bounderies between them, and changing the relative position of the segmented lens with respect to the display window over a first distance and in a first direction oblique to the boundaries of the facets during exposure of the photosensitive material.

The invention further relates to a screen of a colour display tube and a colour display tube provided with a screen that is produced by using said segmented lens.

BACKGROUND OF THE INVENTION

A method of producing a screen for a colour display tube as mentioned in the opening paragraph is disclosed in U.S. Pat. No. 4,866,466. The method according to this specification describes an exposure process for manufacturing screens for colour display tubes. In this exposure process a segmented lens is used. The presently used segmented lens is manufactured by using a mould which contains a two-dimensional array of metal poles. The segmented lens comprises a glass carrier which—in the manufacturing process of the segmented lens—is brought together with the metal mould, while keeping a well-defined distance to this mould. The space between the segmented lens and the mould is filled with a fluid plastic that hardens after it has been applied, for instance by exposing it to UV light. The segmented lens consisting of a glass carrier provided with a plastic layer which contains the facets, being the inclined top faces of the segments of the lens, is then removed from the mould.

The metal poles of this mould are stacked by just placing them next to each other, starting in one corner of the two dimensional array which typically consists of 21 by 17 metal poles each having a bottom surface of 8*8 mm$^2$. This way of stacking has the disadvantage that tolerance errors in the parallellism of opposite sides—which are in contact with a side of an adjacent metal pole—of the metal poles add up, leading to obliquely positioned metal poles. As a result the facets of these metal poles will have a wrong inclination, causing landing errors. These misregistrations lead to a deteriorating performance with respect to colour purity. In this way of stacking, it is important that the metal poles are firmly pressed together, so that the friction between adjacent metal poles prevents that the metal poles can become detached from the mould when the segmented lens is removed On the inner side of the display window, a colour display tube is provided with a screen. This screen has in general a black matrix structure having a pattern of apertures, in which apertures the electroluminescent material is provided. The structure of the black matrix in most common colour display tubes is either a dotted pattern or a line pattern. This pattern is produced by exposing a photosensitive material that is deposited on the inner side of the display window and by using an exposure system and the shadow mask, which serves as the colour selection means in colour display tubes. For exposing colour display tubes with a line pattern an exposure system with a continuous lens can be used. However, for colour display tubes with a dotted pattern, it is common use to apply a segmented lens in order to have enough degrees of freedom to obtain a dotted pattern on the screen that fulfils the requirements regarding good landing properties. Landing in a colour display tube is the quality that defines how well the electron beams that hit the screen coincide with the corresponding electroluminescent material.

After the black matrix layer has been applied on the inner side of the display window, another photosensitive process is used for applying the electroluminescent material—for instance, three colours of phosphor like red, green and blue—to the areas of the display window that were left free by the black matrix structure.

In producing a screen with a dotted pattern, light from a point source is directed through the segmented lens and the shadow mask. This segmented lens comprises a two dimensional array of differently inclined facets. In case the screen is illuminated through a stationary segmented lens, the images of consecutive facets will not fit as consecutive areas on the screen. This will cause dark and light lines, during the exposure process, in the areas where the images of two consecutive facets are disjunct or overlap, respectively. This phenomenon is normally referred to as facet marking. In order to obtain a substantially uniform illumination over the entire screen, the segmented lens is moved during the exposure process. These movements are in general in oblique directions, called the wobble and drift direction, with respect to the rectangular array of facets. The wobble and drift directions are mutually nearly orthogonal. By this method, the image of one facet is by this method spread over a larger area, so that the light and dark lines are smeared out to such an extent that facet marking is reduced.

The ever-increasing demand for improved image quality in colour display tubes also leads to higher requirements with respect to the colour purity. This colour purity is directly related to the landing properties of the colour display tube and so, also to the quality of the segmented lens.

SUMMARY OF THE INVENTION

It is an object of the invention to provide a method of producing a segmented lens for the exposure system used in the manufacturing process of colour display tubes that leads to a colour display tube with an improved behaviour with respect to landing and colour purity.

According to the present invention, this object is achieved by means of a method of producing a segmented lens, in which a fluid plastic is applied between a glass carrier and a mould comprising a two-dimensional array of metal poles, each metal pole having a top section which is rectangular in shape, a top surface with a chosen inclination and a bottom section which is cylindrical in shape for engaging a corresponding two-dimensional array of round apertures in a carrier plate, which fluid plastic is hardened after which the segmented lens, being the assembly of the glass carrier and the plastic top layer having a two dimensional array of facets, is removed from the mould.

The invention is based on the recognition that the tolerances that occur in stacking the two-dimensional array of metal poles can be strongly diminished when the metal poles are supported by a carrier plate only and do not lean against adjacent metal poles. The invention is realized by making a mould which has a carrier plate that serves as the bottom. In this carrier plate a two dimensional array of round apertures is provided. The metal poles have a bottom section that is round in shape to engage the apertures in the carrier plate. By inserting the metal poles in the round apertures of the carrier plate, a two-dimensional array of metal poles is formed which are freely positioned without leading to wrong inclinations of the facets due to adding the errors in parallellism of the metal poles. In order to be able to remove the segmented lens from the mould after the plastic has hardened, it is required to fix the metal poles firmly to the carrier plate, for instance by locking them with a screw at the bottom side. Application of this invention in the production process of colour display tubes leads to a strongly improved landing performance, and so, to a better colour purity.

In EP-0737996-A1 a mould is disclosed that is in one piece. This mould has some disadvantages with respect to the mould according to the present invention. In a one-piece mould it is very difficult to have all the facets and side faces well defined and to have sharp edges between the side faces and the facets. By making a mould from separate metal poles, the transition between two adjacent facets in the segmented lens is more accurately determined because the metal poles intrinsically have side faces that are perpendicular to the carrier plate and the top surfaces, and the facets can be made with high accuracy. Another advantage of the mould according to the present invention is the possibility to replace individual poles, which may be necessary when one of the facets is damaged or in case of a manufacturing error.

In a preferred embodiment, the method of producing a segmented lens is characterized in that the dimensions of the top section of the metal poles in a plane parallel to the carrier plate are 4 mm by 4 mm.

This method results in a segmented lens with facets that are 4*4 mm$^2$, which is in both directions half the size of the prior art facets. Using such a segmented lens with four times the number of facets enables a better design of the inclinations of the facets. The differences between the inclinations of adjacent facets will be smaller than in a segmented lens of the prior art. This is an important measure in counteracting facet marking. Further, the landing performance will be improved, because the inclinations of the facets are better defined.

A further embodiment is characterized in that the two dimensional array contains 42 metal poles by 34 metal poles.

In the prior art, a segmented lens with an array of 21 by 17 facets is used; by doubling the number of facets in both directions when the dimensions are halved, the overall size of the segmented lens is kept unaltered. This has the advantage that the equipment in the exposure system does not have to be changed and the same amount of light is available for exposing the screen.

It is another object of the invention to provide a method of producing a screen for use in a colour display tube which will result in a colour display tube with an improved performance with respect to facet marking and colour purity.

According to the present invention, this object is achieved by means of a method of producing a screen, which is characterized in that an image of a first facet in the one extreme position substantially coincides with an image of a second facet which is separated from the first facet in a diagonal direction by a distance which is a multiple, being at least two, of the diagonal of the first facet.

This is based on the insight that by wobbling the segmented lens over a multiple, of at least two, of the diagonal distance of a facet, the facet marking is reduced. This effect is reached by spreading out the exposure of one facet over a larger area of the screen.

In a further embodiment, a method of producing a screen which further comprises a second direction, substantially perpendicular to said first direction, and a second distance over which the relative position of the segmented lens is changed with respect to the display window, is characterized in that the second distance is a multiple, being at least two, of half the diagonal of a facet.

This embodiment reduces the facet marking even more as a result of the fact that it also increases the drift distance to a multiple of the distance of half the diagonal of a facet. This results in an even stronger spread of the image of one facet over the screen.

A further embodiment is characterized in that the first distance over which the position of the segmented lens is changed with respect to the display window, is two times the second distance over which the position of the segmented lens is changed with respect to the display window.

In this embodiment the wobble distance is twice the drift distance and both are a multiple of the prior art distance, thereby improving facet marking.

A preferred embodiment is characterized in that the first distance over which the position of the segmented lens is changed with respect to the display window is two times the diagonal of a facet.

By doubling the wobble and drift distance, facet marking is considerably reduced. When this double wobble and drift distance is combined with a segmented lens in which the dimensions of the facets have been halved, the absolute wobble and drift distances are not changed. This measure only requires an adaptation of the segmented lens, while the rest of the exposure system can be left the same.

The invention also relates to a screen for a colour display tube that is produced by the method according to the invention, as well as to a colour display tube provided with such a screen.

These and other aspects of the invention will be apparent from and elucidated by way of non-limitative examples with reference to the drawings and the embodiments described hereinafter.

DETAILED DESCRIPTION OF THE INVENTION

Figure 1:
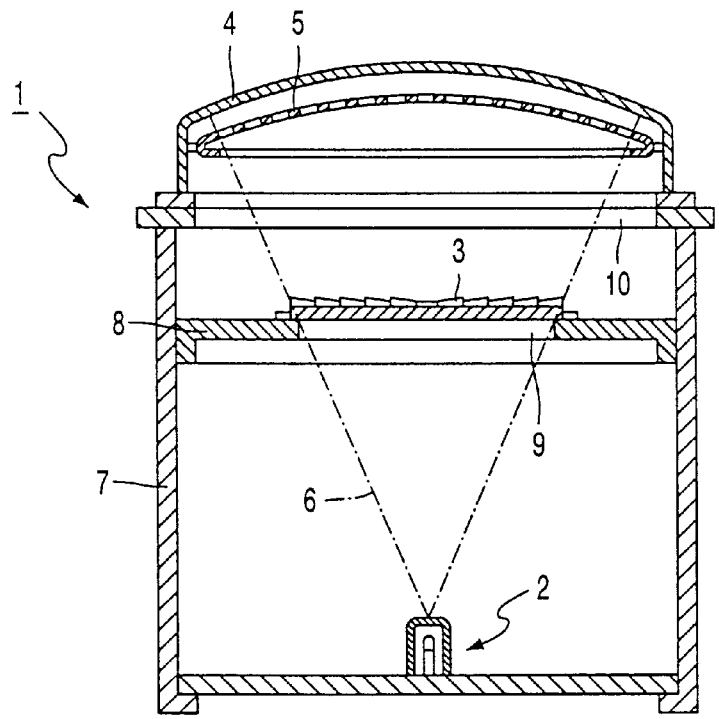
FIG. 1 is a diagrammatic vertical cross-section of a lighthouse.

The lighthouse 1, as shown in FIG. 1, is the standard exposure equipment for exposing the photosensitive material on the inner side of a display window 4. At the bottom of the housing 7, a point light source 2 is positioned. The light from this point light source 2 passes the aperture 9 in the support 8 for the segmented lens 3. After having passed said segmented lens 3, the light travels through the aperture 10 in the top of the lighthouse 1, through the mask 5, towards the inner side of the display window 4. The dashed lines 6 indicate the opening angle of the light beam coming from the point light source 2, showing that in this example the entire screen 11—which is provided on the inner side of the display window 4—will be exposed.

Figure 2:
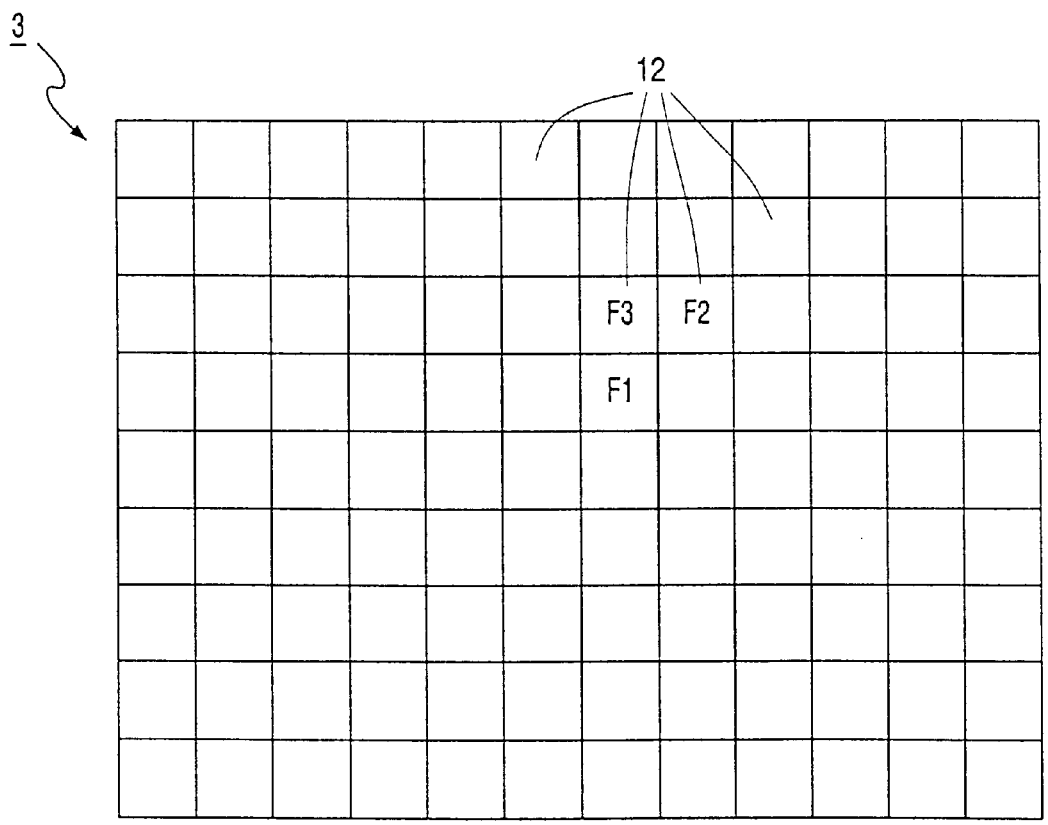
FIG. 2 is, in top view, the rectangular two dimensional array structure of a segmented lens.

FIG. 2 shows a top view of the segmented lens 3. Such a lens comprises a plurality of segments, which are commonly called facets 12, some of which are denoted by F1, F2 and F3. As an example, a segmented lens 3 according to the prior art with an array of 21 facets 12 in the horizontal and 17 in the vertical direction may be used, each facet 12 having dimensions of $8*8$ mm$^2$. Normally the bottom side of a segmented lens is flat, and on the top side the inclination of all the separate facets 12 is chosen so that the light coming from the point light source 2 (FIG. 1) is refracted in such way that the light rays coincide substantially with the deflected electron trajectories for a given point on the screen.

Figure 3:
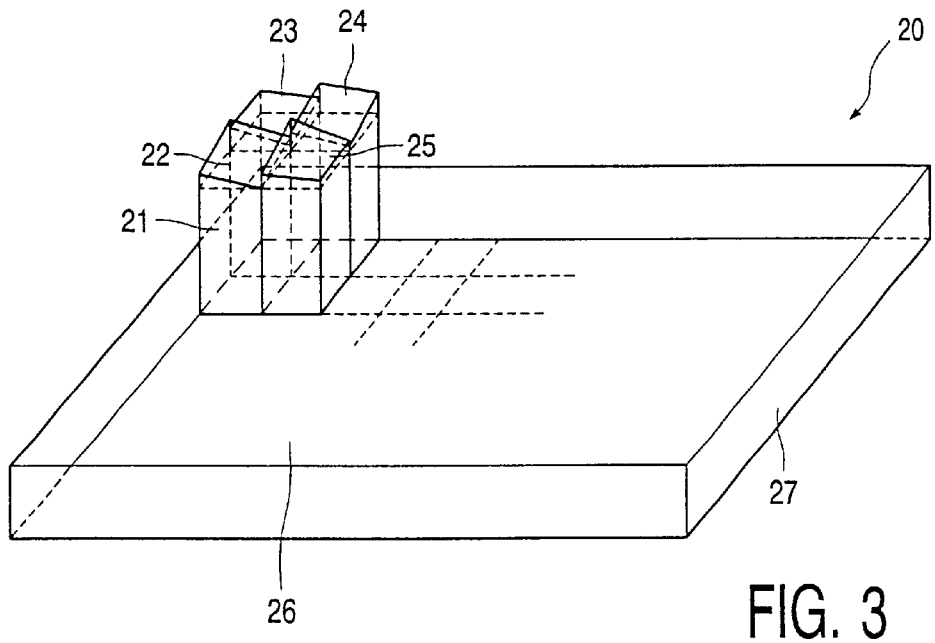
FIG. 3 is a perspective view of a part of a mould for producing a segmented lens according to the prior art.

The mould 20 for producing a segmented lens 3 according to the prior art is given in FIG. 3. The mould 20 comprises a carrier plate 26 provided with an upright edge 27. In this carrier plate 26, the two-dimensional array of poles 21 is arranged. In FIG. 3, by way of example four poles 21 are shown, each having a different inclination of the facets 22, 23, 24, 25 at the top faces. The poles 21 are stacked on the carrier plate 26, starting from one corner and positioning each consecutive pole 21 against at least one pole 21 that is already positioned. The poles 21 contact one another at their side faces, which has the disadvantage that errors in the parallellism of the side faces propagate through the mould 20 during the stacking process. This leads to errors in the inclination of the facets that increase as a function of the distance to the corner where the stacking process starts.

After the mould 20 has been stacked, the segmented lens 3 is manufactured. In this process, a fluid plastic is provided on top of a glass carrier plate. This is pressed together with the mould 20 after which the fluid plastic hardens, for instance by UV illumination. Then the mould 20 is removed and the segmented lens 3 results. So, the segmented lens 3 comprises a glass carrier plate and on top thereof a plastic layer containing all the facets having the complementary shape of the top side of the mould 20.

Figure 4A:
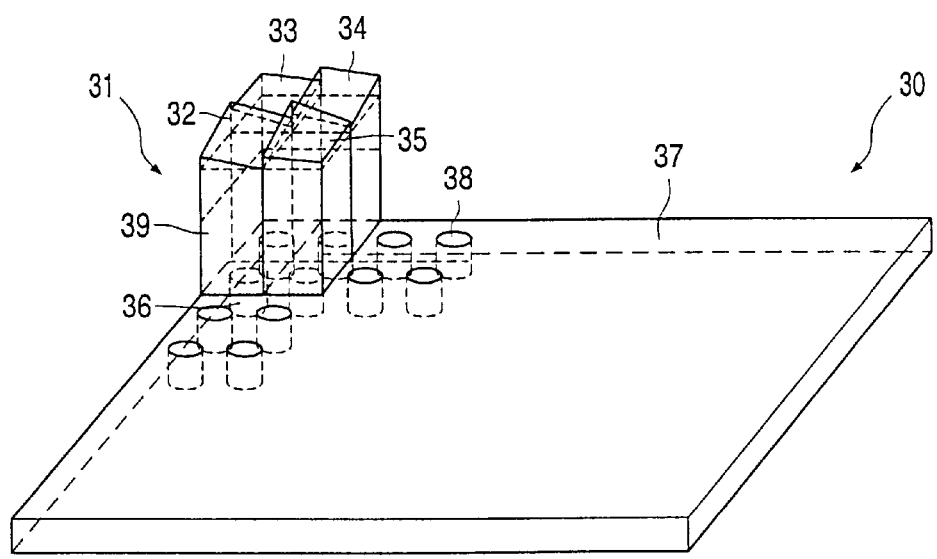
FIG. 4A is a perspective view of a part of a mould for producing a segmented lens according to the present invention.
Figure 4B:
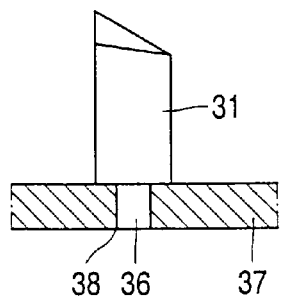
FIG. 4B is a cross section of a pole mounted in the mould.

FIG. 4A shows a mould 30 according to the invention. The mould 30 comprises a carrier plate 37 which is provided with a two-dimensional pattern of cylindrical apertures 38. The poles 31 are provided with a rectangular top section 39 and with a bottom section, shaped like a cylindrical projection 36, which are dimensioned to fit into the cylindrical apertures 38 of the carrier plate 37. The poles 31 are each provided with a facet having the proper inclination, as indicated by way of example by four poles 31 with facets 32, 33, 34, 35. In the stacking process of this mould 30, the poles 31 are positioned by inserting them with their cylindrical projections 36 into the corresponding apertures 37. This is illustrated by FIG. 4B, which shows a cross-section of a pole 31, and which clearly shows that the cylindrical projection 36 is positioned in the aperture 37 of the mould 30. It is also possible to use oblong projections instead of cylindrical projections 36. At the same time, the apertures 38 in the carrier plate are made oblong as well. This construction is slightly more complex, but has the advantage that the metal poles cannot rotate around their axis perpendicularly to the carrier plate.

Alternatively, the metal poles can be manufactured from glass or ceramic material, although this makes the construction of the mould 30 more difficult.

By virtue of this method of stacking, adjacent metal poles 31 do not lean against each other. Each individual metal pole 31 is self-supporting by means of its projection 36. In this way, errors in parallellism of the side faces do not lead to errors in the inclination of the facet angles. The use of a mould 30 according to the invention solves the problem of the registration errors that originate from obliquely positioned metal poles 31.

The construction of a mould 30 according to the present invention is important because this enables a segmented lens 3 with smaller facets.

Figure 5A:
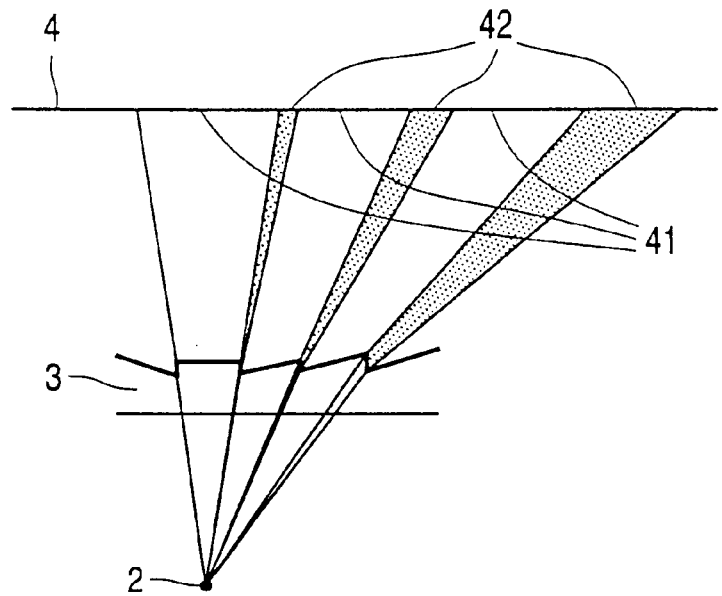
FIGS. 5A and 5B are illustrations of the effects of facet marking.
Figure 5B:
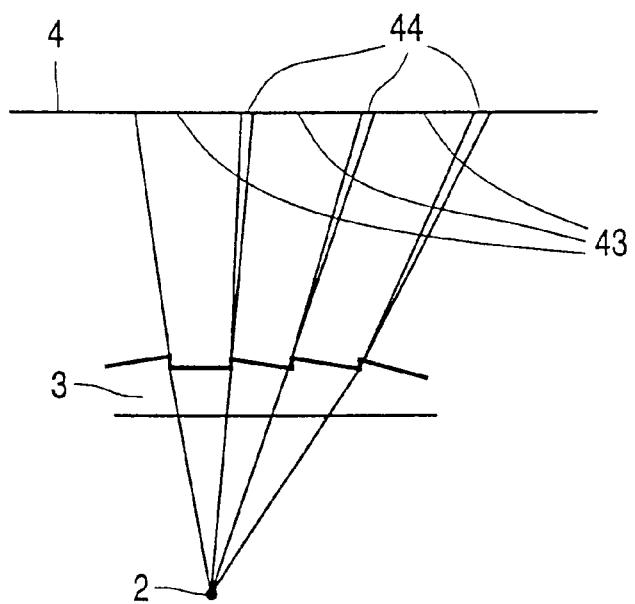

One of the important items in the performance of colour display tubes is a phenomenon called facet marking. During the exposure process, each facet is imaged on the display window 4. Because adjacent facets show a slightly different inclination and because of the steps between the surfaces of adjacent facets, the images of two such facets are either disjunct or they demonstrate an overlap. In the first situation, a dark line will appear between the images of the two facets, while in the second situation a bright line will appear. As an example, FIGS. 5A and 5B give the situations for disjunct images 41, that is dark lines 42, and for overlapping images 43, that is bright lines 44.

Figure 6:
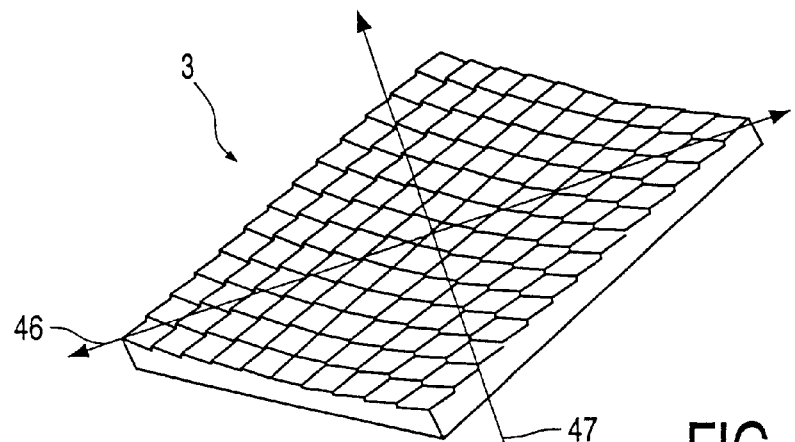
FIG. 6 is a segmented lens indicating the wobble and drift directions.
Figure 7:
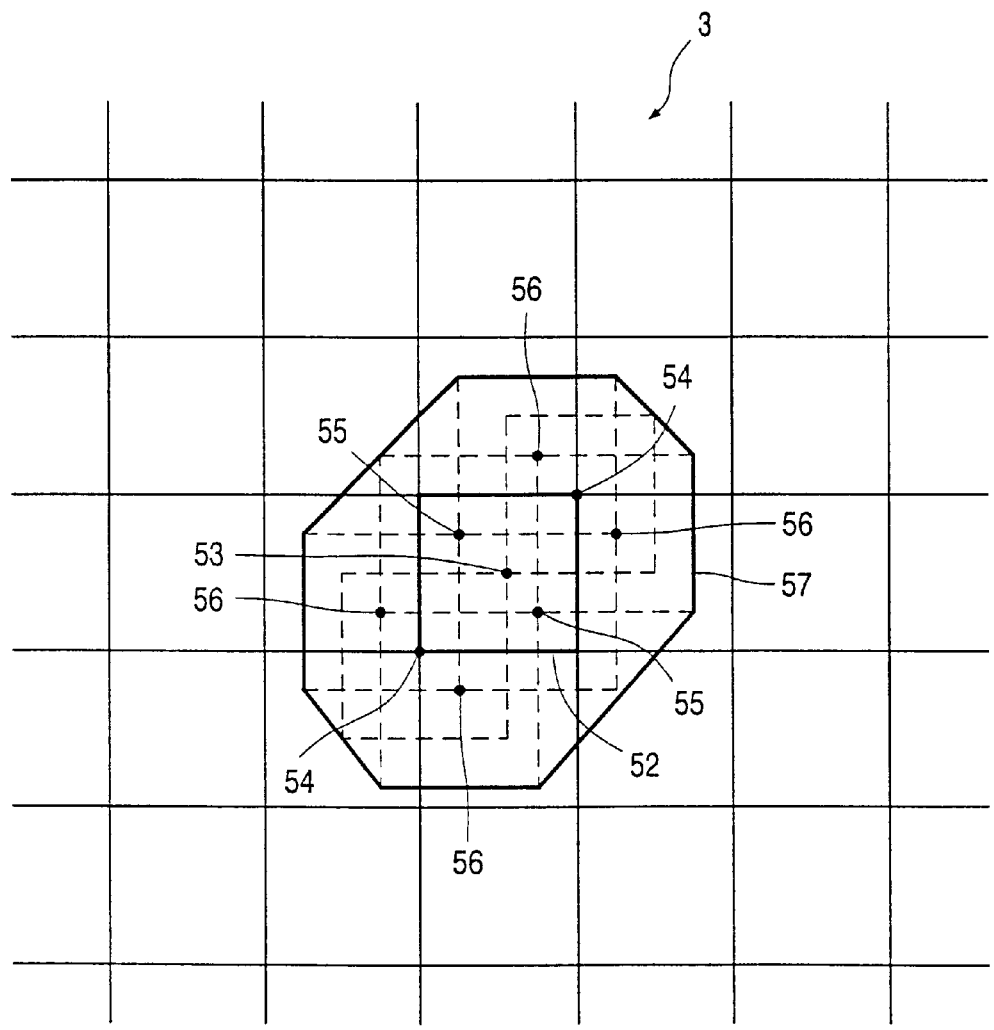
FIG. 7 shows the image of a facet when it is wobbled and drifted.

Facet marking is currently reduced by wobbling and drifting the segmented lens. This is illustrated in FIG. 6, where the arrow bearing numeral 46 indicates the wobble direction and the arrow bearing numeral 47 indicates the drift direction. Preferably, but not necessarily, these directions are nearly orthogonal and in the direction of the diagonal of the facets. In present day colour picture tubes, the image of one facet is smeared out over an area that is the result of a wobble with a stroke of one time the size of the diagonal of a facet and a drift with a stroke of half the size of the diagonal of a facet. This is illustrated in FIG. 7: the area that is imaged by facet 52 with centre 53 is smeared out over the area 57. Point 53 is the centre of facet 52 in the stationary situation; the points 54 are the centres at the extreme wobble positions, points 55 at the extreme drift positions and points 56 at the extreme positions of wobble and drift combined.

The facet marking can be improved by, amongst others, two measures. First, the size of the facets 12 can be made smaller and secondly the wobble and drift distances 46, 47 can be increased. That a decrease of the facet size leads to an improvement with respect to facet marking was already recognized by Yamazaki et al (SMPTE conference 1972), but he also stated that smaller facets 'turned out to be unfeasible for production use for reasons of economy. Since then the standard facet size of $8*8$ mm$^2$ has not changed. Decreasing the facet size makes it possible to improve the registration quality because the larger number of facets 12 of the segmented lens 3 enables a better optimization of the local inclinations of the facets 12. However, this gain in registration quality is counteracted by the errors in the inclination of the facets 12 that are due to the errors in parallellism. A larger number of facets inevitably lead to an increase of these errors. For that reason, a decrease of the facet size is not advantageous when the segmented lens 3 is manufactured with a mould 20 according to the prior art.

The design and the way of stacking the poles 31 in the mould 30 according to the present invention makes it possible to decrease the size of the facets 12.

Using the first measure, the size of the facets 12 is decreased and at the same time the wobble and drift distances 46, 47 are maintained at the existing level, that is measured in terms of the size of the facets 12, resulting in two effects. First, by decreasing the size of the facets 12 the registration is improved, that is the image of the light rays during the exposure process better matches the trajectories of the electron beams in a colour display tube during operation. So, a better registration leads to a colour display tube with improved landing properties and colour purity. This effect is reached because smaller facets 12 enable the inclination of these facets 12 to be more accurately chosen because the image of each facet 12 corresponds to a smaller area on the display window 4.

Secondly, by using smaller facets 12, the difference in inclination of adjacent facets 12 will be smaller as well as the steps between the surfaces of adjacent facets 12, leading to a decrease of the facet marking. Further, when the wobble and drift distances 46, 47 are kept relatively the same—that is with respect to the size of the facets 12—the width of the dark or bright lines causing the facet marking will scale to the size of the facets 12. Smaller facets 12 lead to smaller dark or bright lines and consequentially the visibility of the facet marking will diminish.

In the case of the second measure, when the wobble and drift distances 46, 47 are increased, the image of one facet 12 is smeared out over a larger area—compare area 57 in FIG. 7. Evidently this will make the dark and bright lines less visible and facet marking is reduced. However, smearing out the image of a facet 12 over a larger area does not benefit the registration properties of the colour display tube. The choice of the wobble and drift distances 46, 47 should be properly balanced between registration and facet marking performance.

A preferred embodiment is given by the situation in which the size of the facets 12 is halved, while the absolute wobble and drift distances 46, 47 are left unaltered. The half-sized facets improve the registration properties, because instead of the inclination of only one facet 12, now the inclination of four half-sized facets can be optimized. Further, because the wobble and drift distances 46, 47 are kept absolutely the same, the smearing out effect does not negatively influence the registration performance, while both aspects of this measure are beneficial to the facet marking performance.

An additional advantage of this choice is found in the production environment. When the absolute wobble and drift distances 46, 47 are kept the same, the production equipment can be left unaltered; only the segmented lens 3 has to be adapted.

Summarizing, in the manufacturing process of colour display tubes with a dotted screen pattern, to form the screen 11, use is made of a segmented lens 3 for exposing the display window 4 in order to apply a structure of a black matrix layer and a layer with electroluminescent material to it. Principally, a segmented lens 3 gives rise to a phenomenon that is called facet marking; this is a result of the fact that the images of consecutive facets 12 of the lens on the screen 11 are disjunct or partly overlap, giving dark lines 42 or bright lines 44. In present day colour display tubes—especially for use as computer monitors—it is getting more and more important to reduce facet marking as far as possible. It is proposed to manufacture the segmented lens 3 according to a new process in which the mould 30 for the manufacture of said segmented lens is significantly changed. In the new process, the poles 31, for the mould 30 are stacked by placing them with cylindrical projections 36 into apertures 38 of the carrier plate 37. This prevents leaning poles 31 which result in errors in the inclination of the facets 12. This method of manufacturing the mould 30 makes it possible to decrease the facet size and significantly improve the facet marking in colour display tubes.

What is claimed is:

1. A method of producing a segmented lens, in which a fluid plastic is applied between a glass carrier and a mould comprising a two-dimensional array of metal poles, each metal pole having a top section which is rectangular in shape, a top surface with a chosen inclination and a bottom section which is cylindrical in shape for engaging a corresponding two-dimensional array of round apertures in a carrier plate, which fluid plastic is hardened after which the segmented lens, being the assembly of the glass carrier and the plastic top layer having a two dimensional array of facets, is removed from the mould.

2. A method of producing a segmented lens as claimed in claim 1, characterized in that the dimensions of the top section of the metal poles in a plane parallel to the carrier plate are 4 mm by 4 mm.

3. A method of producing a segmented lens as claimed in claim 1, characterized in that the two-dimensional array contains 42 metal poles by 34 metal poles.

4. A segmented lens manufactured by the method as claimed in claim 1.

5. A mould for producing the segmented lens as claimed in claim 4.

6. A method of producing a screen, having a dotted pattern of apertures in a black matrix and electroluminescent material in said apertures, on a display window of a colour display tube, which method comprises, exposing a photosensitive material on the display window to light which has been emitted by a point source and has passed through the segmented lens, as claimed in claim 4, and a mask, the segmented lens comprising facets having a diagonal, with boundaries between them, and changing the relative position of the segmented lens with respect to the display window over a first distance and in a first direction oblique to the boundaries of the facets during exposure of the photosensitive material, characterized in that an image of a first facet in the one extreme position substantially coincides with an image of a second facet, which is separated from the first facet in a diagonal direction by a distance which is a multiple, being at least two, of the diagonal of the first facet.

7. A method of producing a screen as claimed in claim 6, which further comprises a second direction, substantially perpendicular to said first direction and a second distance over which the relative position of the segmented lens is changed with respect to the display window, characterized in that the second distance is a multiple, being at least two, of half the diagonal of a facet.

8. A method of producing a screen as claimed in claim 7, characterized in that the first distance over which the position of the segmented lens is changed with respect to the display window is two times the second distance over which the position of the segmented lens is changed with respect to the display window.

9. A method of producing a screen as claimed in claim 8, characterized in that the first distance over which the position of the segmented lens is changed with respect to the display window is two times the diagonal of a facet.

10. A screen of a colour display tube produced using the method as claimed in claim 6.

11. A colour display tube provided with a screen as claimed in claim 10.

* * * * *